(12) United States Patent
Slutsman et al.

(10) Patent No.: US 8,166,351 B2
(45) Date of Patent: Apr. 24, 2012

(54) FILTERING REDUNDANT EVENTS BASED ON A STATISTICAL CORRELATION BETWEEN EVENTS

(75) Inventors: Lev Slutsman, Ocean, NJ (US); Moshiur Rahman, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 355 days.

(21) Appl. No.: 12/255,149

(22) Filed: Oct. 21, 2008

(65) Prior Publication Data
US 2010/0100775 A1 Apr. 22, 2010

(51) Int. Cl.
*G06F 11/00* (2006.01)
(52) U.S. Cl. ............... 714/48; 714/37; 714/25; 714/26; 714/4.1
(58) Field of Classification Search ............ 714/37, 714/26, 48
See application file for complete search history.

(56) References Cited

U.S. PATENT DOCUMENTS

| | | | |
|---|---|---|---|
| 4,367,458 A | | 1/1983 | Hackett |
| 4,520,481 A | | 5/1985 | Israel |
| 5,159,685 A | * | 10/1992 | Kung .............................. 714/26 |
| 5,259,766 A | | 11/1993 | Sack et al. |
| 6,715,101 B2 | | 3/2004 | Oldfield et al. |
| 2003/0074440 A1 | * | 4/2003 | Grabarnik et al. ............. 709/224 |
| 2004/0133672 A1 | * | 7/2004 | Bhattacharya et al. ....... 709/224 |
| 2004/0153693 A1 | * | 8/2004 | Fisher et al. ..................... 714/4 |
| 2005/0222810 A1 | * | 10/2005 | Buford et al. .................. 702/183 |
| 2007/0177523 A1 | * | 8/2007 | Nagami et al. ................. 370/252 |
| 2007/0234102 A1 | * | 10/2007 | Fan et al. ........................ 714/4 |
| 2008/0016412 A1 | * | 1/2008 | White et al. ..................... 714/48 |
| 2008/0319940 A1 | * | 12/2008 | Garg et al. ........................ 707/2 |
| 2008/0320338 A1 | * | 12/2008 | Ward .............................. 714/43 |
| 2009/0070628 A1 | * | 3/2009 | Gupta et al. .................... 714/26 |
| 2009/0182794 A1 | * | 7/2009 | Sekiguchi ..................... 707/206 |

OTHER PUBLICATIONS

U.S. Appl. No. 12/265,195 entitled "Identifying Redundant Alarms by Determining Coefficients of Correlation Between Alarm Categories," Inventors: Williamson et al.
U.S. Notice of Allowance/Allowability dated Oct. 21, 2010 in U.S. Appl. No. 12/265,195.
U.S. Notice of Allowance dated Mar. 3, 2011 in U.S. Appl. No. 12/265,195.

* cited by examiner

*Primary Examiner* — Scott Baderman
*Assistant Examiner* — Chae Ko
(74) *Attorney, Agent, or Firm* — Hope Baldauff Hartman, LLC

(57) ABSTRACT

Methods, systems, and computer-readable media for filtering redundant fault events from an event stream generated by devices on a network based on a statistical correlation between fault events are provided. Event history data is collected from the fault events generated by devices on the network over a period of time. Statistical correlations are computed between each distinct pair of fault events in the event history data. Based on the statistical correlations, a list of redundant fault events and associated significant events is identified. The list of redundant events and associated significant events is utilized to filter the redundant fault events from the event stream generated by the devices on the network.

15 Claims, 5 Drawing Sheets

FILTERING REDUNDANT EVENTS BASED ON A STATISTICAL CORRELATION BETWEEN EVENTS

BACKGROUND

This application relates generally to the field of network management. More specifically, the disclosure provided herein relates to the management of fault events generated by devices on the network based on a statistical correlation of events.

A critical challenge for network management systems is dealing with the massive amount of information related to network problems or faults that may be generated in a large, complex network. In many cases, this information arrives in a stream of "traps" or fault events from the myriad of devices that make up the network infrastructure. To manage the network efficiently, it is essential to be able to discriminate between the events that are important enough to present to network operations personnel in the form of trouble tickets for diagnosis of the network fault, and the events that are redundant and can be safely discarded.

The important or significant events are those that may indicate a root cause of the network fault, while the redundant events are merely secondary results of the root cause and thus conditioned on the significant event. However, under certain network conditions, redundant events may become significant events and vice versa. Thus, determining which fault events are significant and which are redundant normally requires a detailed knowledge and thorough analysis of the topology of the network and the types of interconnected devices from which it is constructed.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the disclosure presented herein include methods, systems, and computer-readable media for filtering redundant fault events from an event stream generated by devices on a network based on a statistical correlation between fault events. According to aspects, event history data is collected from the network over a period of time. The event history data includes a record of each fault event generated by the devices on the network during that period of time. In one aspect, the record of each fault event includes an event identifier and a timestamp indicating when the fault event occurred.

Statistical correlations are computed between each distinct pair of fault events in the event history data. In one aspect, the statistical correlation between a pair of events is based on the conditional probability that the second event in the pair will occur substantially simultaneously with the first event, given that the first event has occurred. In another aspect, the first event and the second event are determined to have occurred substantially simultaneously when the first event and the second event occur within a specific timeframe in the event history data.

Based on the statistical correlation between pairs of events, a list of redundant fault events and associated significant events is identified. In one aspect, the redundant and significant events are those pairs of events having the conditional probability that the redundant event in the pair will occur substantially simultaneously with the significant event exceeding a threshold probability. The list of redundant events and associated significant events is utilized to filter the redundant fault events from the event stream generated by the devices on the network.

According to another aspect, a number of event expressions are created containing Boolean operations between two or more fault events. Statistical correlations are further computed between each distinct pair of an event expression and a fault event in the event history data. The list of redundant fault events and associated significant events includes those redundant events that are dependent upon the condition defined by the event expressions, based on the statistical correlation between the two.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for filtering redundant fault events generated by devices on a network based on a statistical correlation between events. Utilizing the technologies described herein, a significant percentage of the fault events can be filtered from the event stream before reaching the network operations center. This can be accomplished using statistical analysis of historical event data gathered from the event stream over time, without requiring a complex analysis or understanding of the interaction of the various fault events or a detailed knowledge of the network devices or associated infrastructure.

Figure 1:
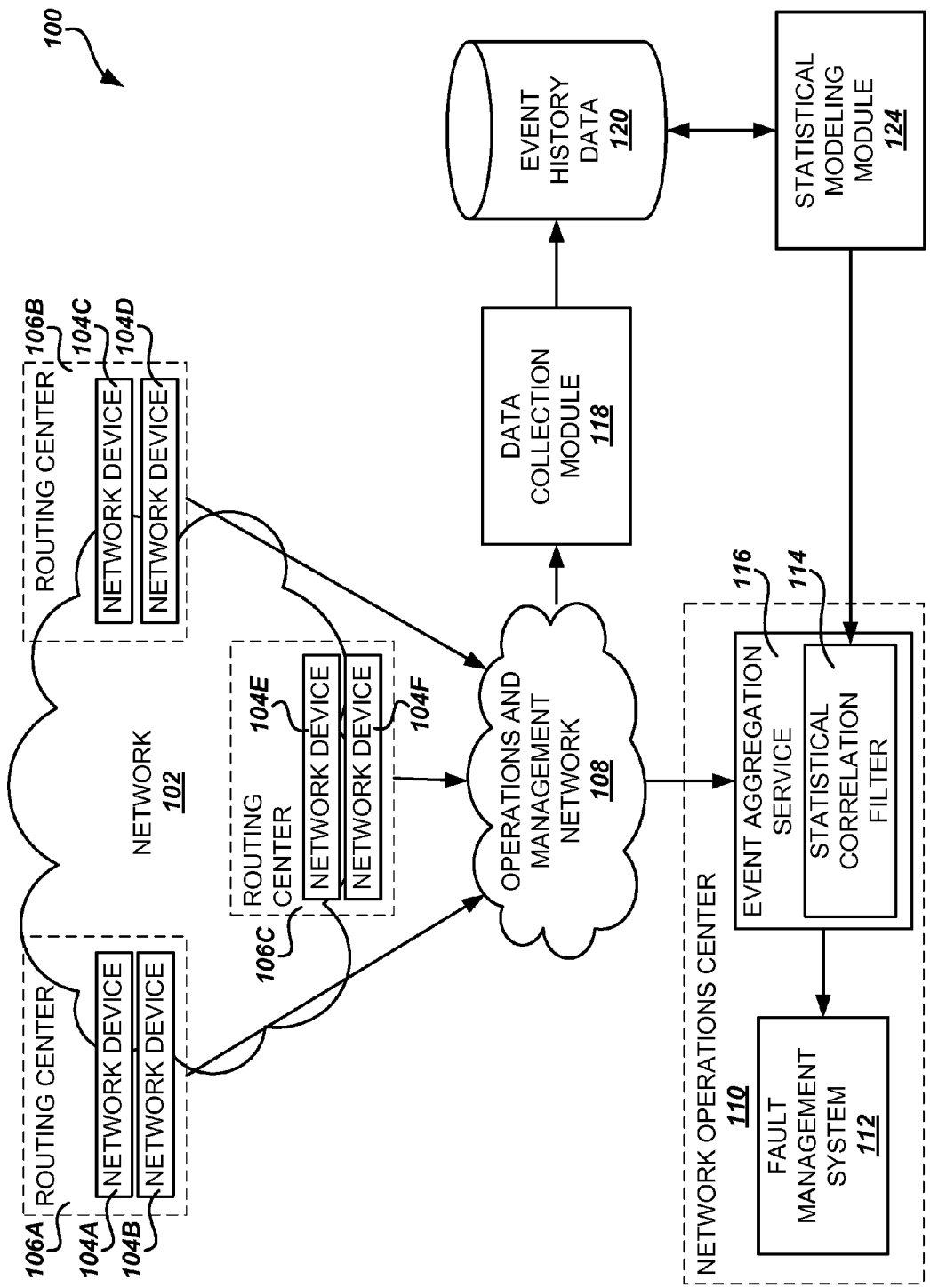
FIG. 1 is a block diagram illustrating an operating environment for filtering redundant events based on a statistical correlation between events, in accordance with exemplary embodiments.

In the following detailed description, references are made to the accompanying drawings that form a part hereof, and that show by way of illustration specific embodiments or examples. In referring to the drawings, it is to be understood that like numerals represent like elements through the several figures, and that not all components described and illustrated with reference to the figures are required for all embodiments. Referring now to FIG. 1, an illustrative operating environment 100 and several software components for filtering redundant events based on a statistical correlation between events is shown, according to embodiments. The environment 100 includes a network 102. According to one embodiment, the network 102 is an Internet backbone network, such as that provided by a network service provider (NSP), upon which flows a variety of Internet Protocol (IP) traffic, including, but not limited to, Web browsing, email, instant messaging (IM), file sharing, telephone calls (VoIP), television (IPTV), and streaming media. It will be appreciated, however, that the network 102 may represent any telecommunications network, such as a corporate wide-area network (WAN), a circuit-switched telephony network, or a cellular communications network.

The infrastructure of the network 102 may include a number of network devices 104A-104F that connect the various segments of the network 102, route network traffic, and provide the other functions necessary for proper operation of the network 102. Examples of the network devices 104A-104F include, but are not limited to, routers, repeaters, access servers, switches, bridges, hubs, gateways, computer hosts, subscriber line cards, and power systems. As may be appreciated by one skilled in the art, the number and types of network devices in a large telecommunications network, such as the network 102, could be substantial, and would likely exceed the number of network devices 104A-104F illustrated in FIG. 1. Further, these devices 104A-104F may be located in many, geographically diverse locations, such as individual routing centers 106A-106C located within the network 102.

The network devices 104A-104F may be further connected to an operations and management network 108, according to embodiments. The operations and management network 108 provides a mechanism for network operations personnel to configure and monitor the network devices 104A-104F. The operations and management network 108 also provides a channel for the devices to report status, error conditions or "faults", and other events to a network operations center 110. The operations and management network 108 may be the same network as the network 102 or it may be a separate, isolated network for internal communication within the NSP. The network devices 104A-104F may utilize a common protocol for communication on the operations and management network 108, such as the Simple Network Management Protocol (SNMP).

The network devices 104A-104F may communicate fault events to a fault management system 112 located in, for example, the network operations center 110. The fault management system 112 may be responsible for detecting fault events from devices on the network 102, logging the fault events, and issuing trouble tickets to network operations personnel for investigation of the faults. The fault management system 112 may be an expert system with knowledge of the network infrastructure and the capability to apply built-in rules, discriminate amongst events, or query device or system statuses before issuing a trouble ticket. It will be appreciated that many other forms of fault management systems with varying capabilities may be conceived by one skilled in the art.

According to embodiments, the fault events are filtered through a statistical correlation filter 114 which utilizes a statistical correlation between events to filter out redundant fault events before the redundant fault events are received by the fault management system 112. This increases the efficiency of the fault management system 112 in that trouble tickets will not be created for the redundant events. The statistical correlation between events relies on statistical analysis of the event stream over a period of time, as will be described in more detail below in regard to FIG. 3. In this way, redundant events can be identified and filtered out of the event steam without requiring a detailed knowledge of the network 102 or an analysis of the topology of the network and the types of interconnected devices from which it is constructed.

In one embodiment, the statistical correlation filter 114 is part of an event aggregation service 116 located in the network operations center 110. The event aggregation service 116 provides a platform for consolidating fault monitoring and management across the various networks 102 as well as opportunities to filter events from the event stream before the events are forwarded to the fault management system 112. In another embodiment, multiple statistical correlation filters 114 may be located on the operations and management network 108 in closer proximity to the devices, such as inside the routing centers 106A-106C. In this way, the redundant events can be filtered at the source, reducing traffic flow on the operations and management network 108.

Figure 2:
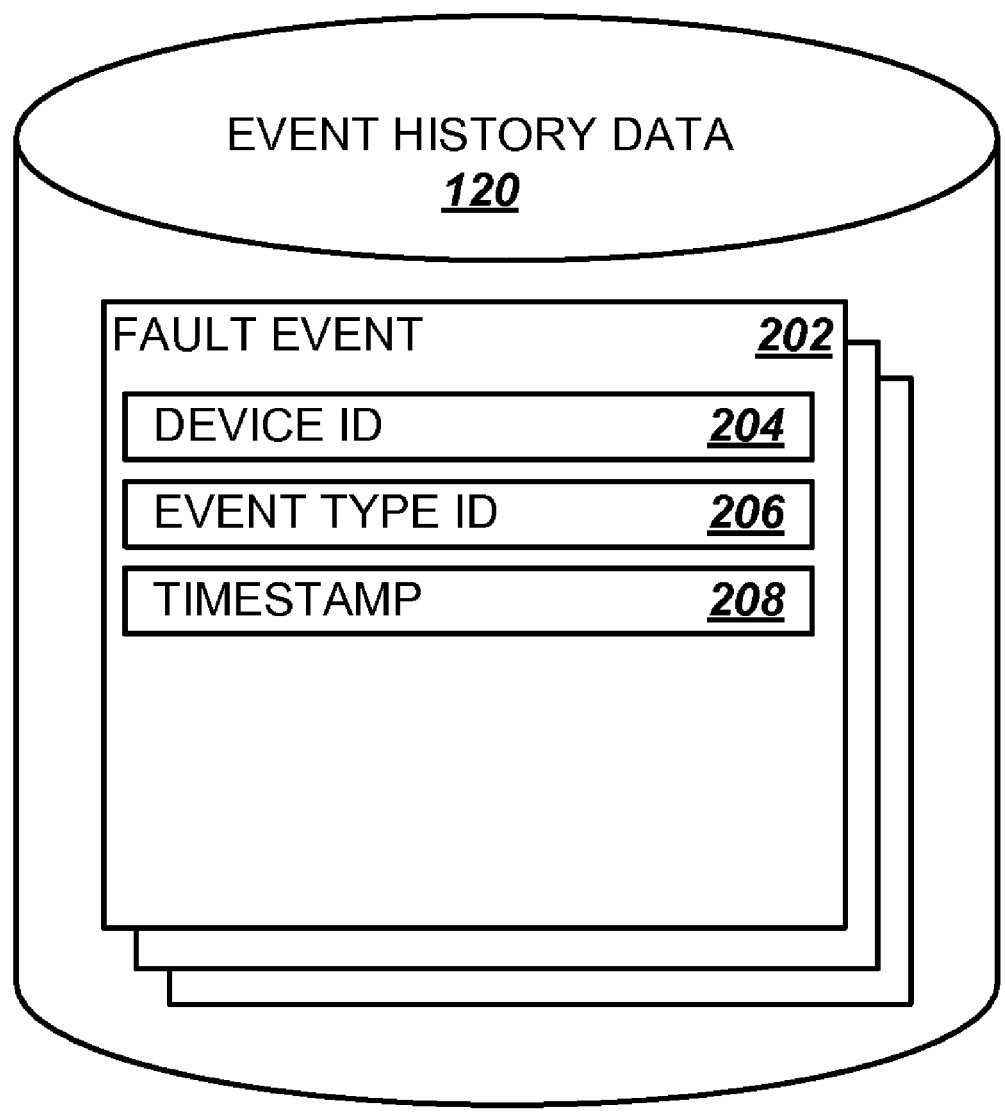
FIG. 2 is a block diagram illustrating event history data collected and utilized to compute statistical correlations between events, according to embodiments presented herein.

In order to provide for the statistical analysis of the event stream, a data collection module 118 may collect and store event history data 120 taken over some period of time. As illustrated in FIG. 2, the event history data 120 may consist of records of individual fault events 202, including a device ID 204 identifying the network device that generated the fault event, an event type ID 206 identifying the type of fault event that was raised, and a timestamp 208 indicating when the fault event occurred. The event history data 120 may be stored in a database to permit statistical computations to be carried out against the data as well as allow other analysis and reporting to be performed. The data collection module 118 may capture the event history data 120 in real-time from the event stream on the operations and management network 108, or the data collection module may extract and convert the data from log files collected from the network devices 104A-104F or provided by the fault management system 112 or event aggregation service 116.

The event history data 120 is accessed by a statistical modeling module 124 to compute the statistical correlation between events and identify the redundant fault events, as will be described in more detail below in regard to FIG. 3. In turn, a list of the identified redundant fault events is provided to the statistical correlation filter 114 which will then filter the redundant events from the event stream. In one embodiment, the statistical computations are performed manually utilizing the functions of the statistical modeling module 124 and the database against event history data 120 collected over a selected period of time. In another embodiment, the event history data 120 is continuously collected by the data collection module 118, while the statistical modeling module 124 periodically computes the statistical correlation between events based on the latest collected data and updates the statistical correlation filter 114 with the list of redundant events.

Figure 3:
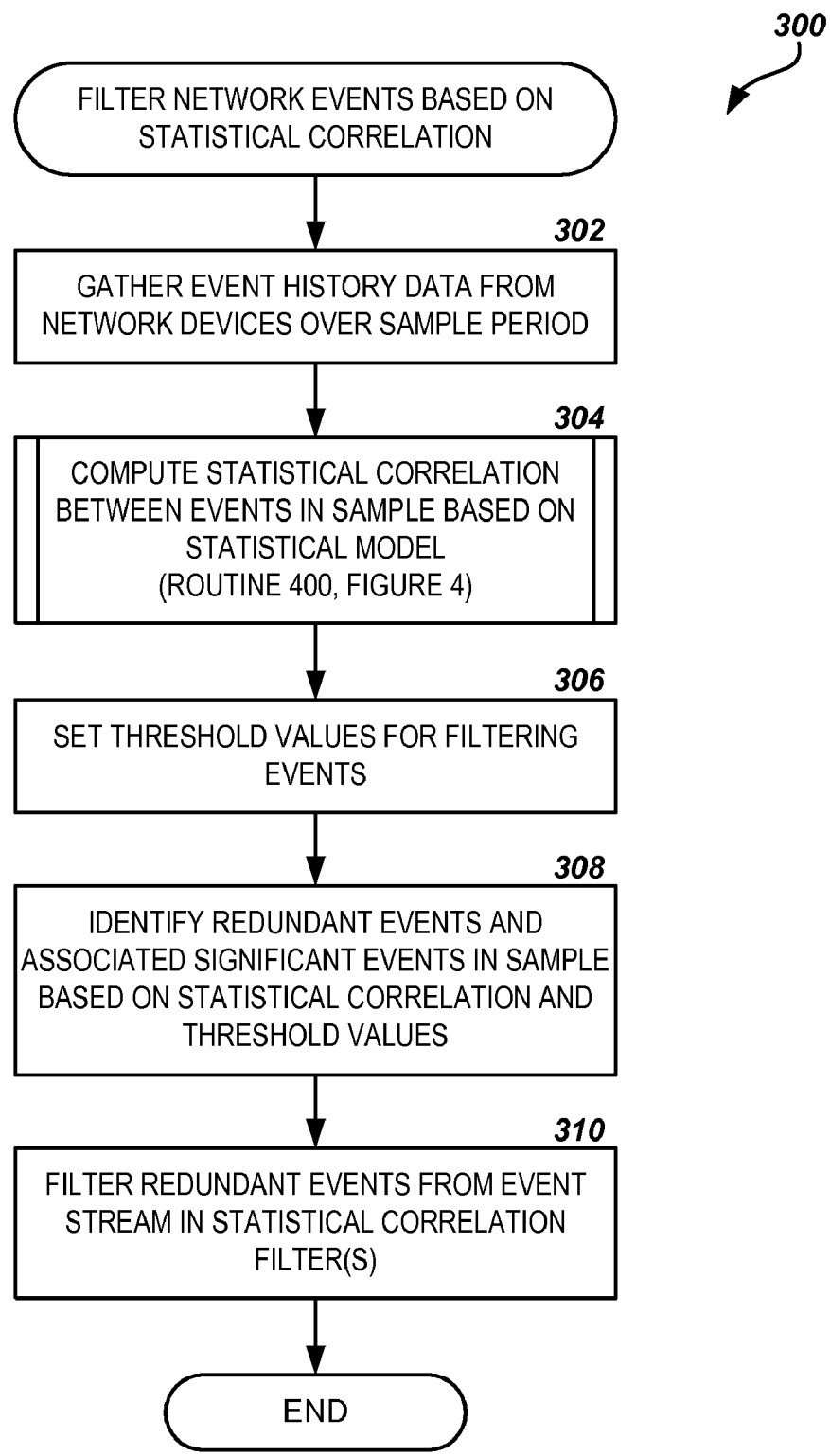
FIG. 3 is a flow diagram illustrating one method for filtering redundant events based on a statistical correlation between events, in accordance with exemplary embodiments.
Figure 4:
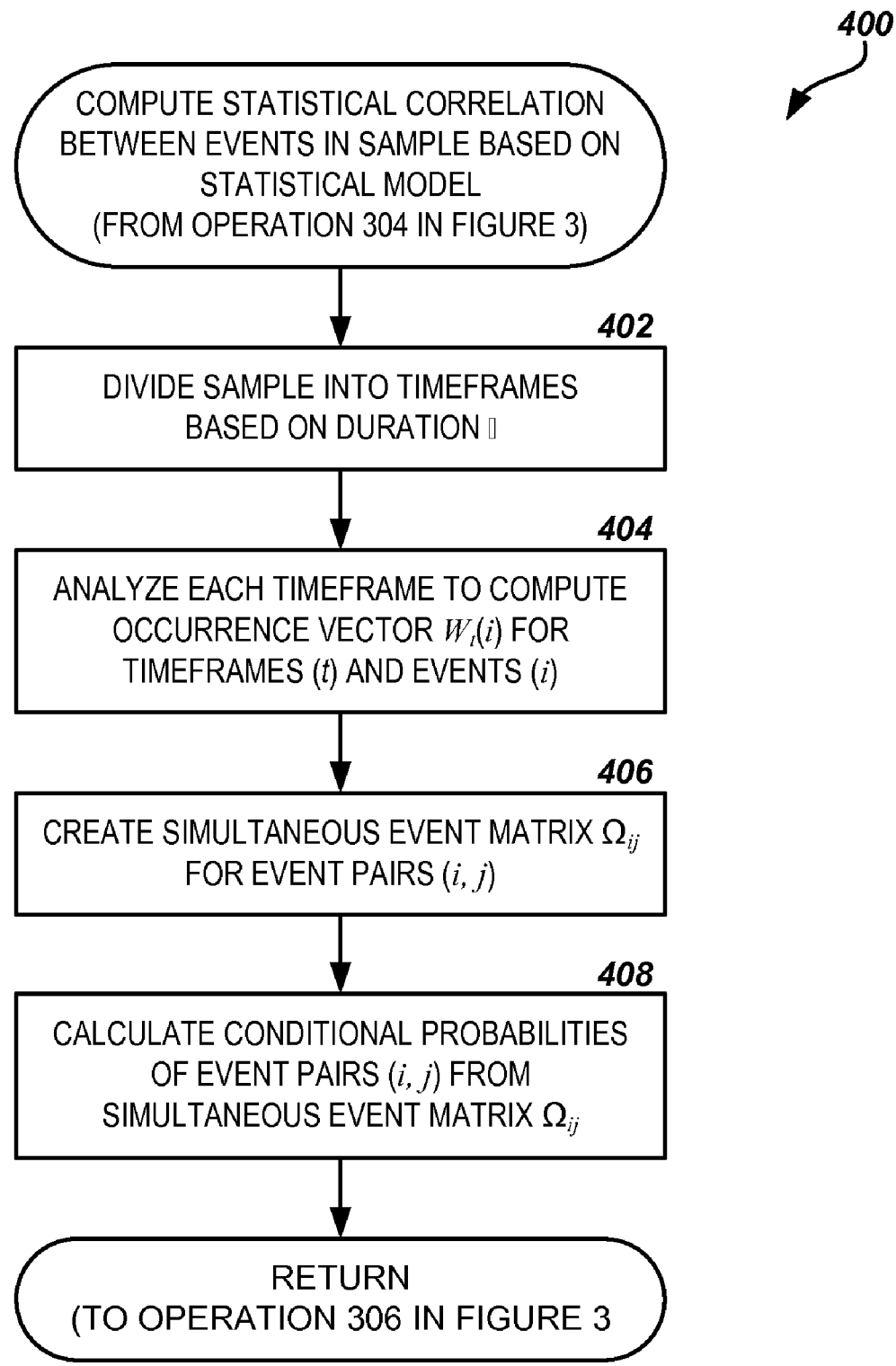
FIG. 4 is a flow diagram illustrating one method for computing the statistical correlation between events, in accordance with exemplary embodiments.

Referring now to FIGS. 3 and 4, additional aspects regarding the operation of the components and software modules described above in regard to FIG. 1 will be provided. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof.

It should also be appreciated that, while the operations are depicted in FIGS. 3 and 4 as occurring in a sequence, various operations described herein may be performed by different components or modules at different times. In addition, more or fewer operations may be performed than shown, and the operations may be performed in a different order than illustrated in FIGS. 3 and 4.

FIG. 3 illustrates an exemplary routine 300 for filtering redundant events based on a statistical correlation between events, in accordance with embodiments. The routine 300 begins at operation 302, where the data collection module 118 gathers the event history data 120 regarding fault events generated by the network devices 104A-104F on the network 102 over a sample period of time. As described above, the data collection module 118 may collect the event history data 120 from the event stream on the operations and management network 108 on a continuous basis, or it may extract and convert the data from log files collected from the network devices 104A-104F or provided by the fault management system 112 or event aggregation service 116. In a further embodiment, the data collection module 118 may only gather the event history data 120 for a subset of the network devices 104A-104F, or only for a portion of the network 102, determined by network operations personnel. This allows the statistical correlations to be performed on a smaller sample of fault events.

According to exemplary embodiments, in order to accurately compute the statistical correlation between events, the sample period of time must be sufficiently large. The sample period will depend on a number of factors including, but not limited to, the number of network devices 104A-104F on the network 102, the rate of fault events generated by the devices, and various assumptions that may be made regarding the network infrastructure. In one embodiment, the sample period may be three months, which may encompass hundreds of thousands of fault events collected from a complex network, such as that operated by an NSP.

From operation 302, the routine 300 proceeds to operation 304 where the statistical modeling module 124 computes the statistical correlation between fault events 202 in the event history data 120 for the sample period. According to one embodiment, for the purposes of computing a statistical correlation between events, all fault events 202 in the event history data 120 of the same type, i.e. having the same event type ID 206, may be deemed to be the same discrete event. It will be appreciated by one skilled in the art that discrete events for the purposes of determining a statistical correlation between events may be identified using other combinations of data in the event history data 120, including, but not limited to, a specific type of fault event 202, based on the event type ID 206, from a specific device, based on the device ID 204, or a specific type of fault event 202 from a specific class of devices.

In one embodiment, the statistical model used to compute the statistical correlation between two events entails the calculation of the conditional probability that the second event will occur substantially simultaneously with the first event given that the first event has already occurred, as will be described in more detail below in regard to FIG. 4. In this model, if the second event is very likely to occur substantially simultaneously with first event, then the second event is likely dependent upon the first event, i.e. likely caused by the same root cause as the first event.

If the first event is investigated and the root cause is removed, there is a high likelihood that the second event will be resolved as well. Accordingly, when there is a high conditional probability that the second event will occur substantially simultaneously with the first event, the second event is deemed to be a redundant event, with the first event considered the important or significant event. It will be appreciated, however, that other statistical models could be utilized by the statistical modeling module 124 to compute a statistical correlation between events beyond those described herein, and this application is intended to cover all such statistical models.

The routine 300 then proceeds from operation 304 to operation 306, where a threshold value is determined for identifying redundant events based on the statistical correlation between events computed by the statistical modeling module 124. The value for the threshold may be based upon the size of the sample taken, the sample period over which the event history data 120 was collected, or the past success of the statistical model. For example, in the conditional probability model described above, an event may be considered a redundant event only if the conditional probability of the event occurring substantially simultaneously with the significant event exceeds a 95% threshold. This threshold level of probability may provide a significant reduction in the number of fault events processed by the fault management system 112 while ensuring a high level of dependency is required before deeming a fault event to be a redundant event. In another embodiment, a threshold probability of 99.99% may be preferred.

From operation 306, the routine 300 proceeds to operation 308, where the statistical modeling module 124 identifies the redundant events based on the statistical correlation computed between the events in operation 304 and the threshold value determined in operation 306. In one embodiment, the statistical modeling module 124 produces a list of redundant events along with the associated significant event for each. This list includes events where the conditional probability of the event occurring substantially simultaneously with the significant event exceeds the threshold value. The list is provided to the statistical correlation filter 114.

The routine 300 then proceeds from operation 308 to operation 310, where the statistical correlation filter 114 filters the redundant events from the event stream on the operations and management network 108 before the redundant events reach the fault management system 112. For example, utilizing the list of redundant events and associated significant event for each generated by the statistical modeling module 124 in operation 308, the statistical correlation filter 114 can detect when a redundant event occurs and remove the redundant event from the event stream if the significant event has occurred substantially simultaneously, i.e. occurred within a specific interval of time before the redundant event. The time interval for determining whether the significant and redundant events occurred substantially simultaneously may be the same as the timeframe used in computing the conditional probability between the two events, as described in more detail below in regard to FIG. 4, or may be some other value, dependent upon other factors. From operation 310, the routine 300 ends.

FIG. 4 illustrates an exemplary routine 400 for computing the statistical correlation between events in the event history data 120 over the sample time period, according to embodiments. The method for computing the statistical correlation between two events, $E_1$ and $E_2$, illustrated by routine 400 is based on the concept of "conditional probability", that is the probability that the second event $E_2$ will occur substantially simultaneously with the first event $E_1$ given that the first event $E_1$ has occurred, denoted $P(E_2|E_1)$. As discussed above, if $P(E_2|E_1)$ is very high, then the event $E_2$ is likely dependent upon the first event $E_1$, i.e. likely caused by the same root cause as $E_1$. As further discussed above, $E_1$ in this embodiment is deemed to be the significant event, and $E_2$ the redundant event.

The routine 400 to compute the statistical correlation between events begins at operation 402, where the statistical modeling module 124 divides the sample period selected above in operation 302 into a number of discrete timeframes based on a specified duration value, $\nabla$. According to one embodiment, the timeframes in the sample are determined by taking the first fault event from the event history data 120 in the sample period, and designating the time of its occurrence as $T_0$. The first timeframe in the sample period, therefore, would be from $T_0$ to $T_0+\nabla$. All fault events 202 in the event history data 120 having a timestamp 208 within the timeframe $T_0$ to $T_0+\nabla$ would be considered to have occurred substantially simultaneously for the purposes of the statistical model. Similarly, the first fault event 202 from the event history data 120 to occur after $T_0+\nabla$ would start the next timeframe. The total number of discrete timeframes determined to be in the sample period is denoted F.

The division of the sample period into F discrete timeframes of duration $\nabla$ both simplifies the conditional probability computations below and allows for a designated threshold period for fault events 202 in the event history data 120 to be considered as occurring substantially simultaneously. The selection of the value for duration $\nabla$ may depend on a number of factors including, but not limited to, the total duration of the selected sample period, the rate that fault events 202 occur within the event history data 120, and the nature of the relationship between correlated events in previous computations. For example, given a sample period of three months selected above, a value of two or three minutes may be selected for the duration $\nabla$.

From operation 402, the routine 400 proceeds to operation 404 where the statistical modeling module 124 analyzes each timeframe in the event history data 120 to determine which events occurred in the timeframe. This analysis will result in an occurrence vector $W_t(i)$ for each timeframe and for each discrete event in the event history data 120 over the selected sample period. If N equals the number of discrete events in the event history data 120 over the selected sample period, then the vector $W_t(i)$ could be denoted as:

$$W_t(i) = \begin{cases} 1 & \text{if event } E_i \text{ occurs in timeframe } t \\ 0 & \text{otherwise} \end{cases}$$

for each timeframe t, t=1, 2, ... F and each discrete event $E_i$, i=1, 2, ... N. The computation of the vector $W_t(i)$ may be performed by the statistical modeling module 124 using internal logic or may be performed by a query against the database containing the event history data 120. The statistical modeling module 124 may store the resulting vector $W_t(i)$ in a table in internal memory.

Next, the routine 400 proceeds from operation 404 to operation 406 where the statistical modeling module 124 constructs a simultaneous event matrix $\Omega_{ij}$ representing a count of the number of timeframes within the sample period of the event history data 120 where events $E_i$ and $E_j$ occurred substantially simultaneously, i.e. within the same timeframe, for each discrete pair of events $E_i$ and $E_j$, i≠j. Where i=j, the matrix $\Omega_{ij}$ simply represents a count of the number of timeframes where $E_i$ occurred. Thus, the matrix $\Omega_{ij}$ is denoted as:

$$\Omega_{ij} = \begin{pmatrix} i \neq j\text{: number of times } E_i \text{ and } E_j \text{ occur simultaneously} \\ i = j\text{: number of times } E_i \text{ occurs} \end{pmatrix}$$

for each discrete pair of events $E_i$ and $E_j$, i=1, 2, ... N, j=1, 2, ... N. As will be appreciated, the statistical modeling module 124 may use the internal memory table representing the occurrence vector $W_t(i)$ computed in operation 404 to construct the matrix $\Omega_{ij}$. Note that because the matrix $\Omega_{ij}$ indicates the number of timeframes in which the events occurred and not the number of occurrence of each event, duplicate events occurring in the same timeframe are effectively ignored.

From operation 406, the routine 400 proceeds to operation 408 where the statistical modeling module 124 calculates the conditional probabilities for each discrete pair of events $E_i$ and $E_j$, using the matrix $\Omega_{ij}$ constructed in operation 406. As discussed above, the conditional probability of the second event $E_j$ of a pair occurring substantially simultaneously, i.e. within the same timeframe, with the first event $E_i$ of the pair given that the first event $E_i$ has occurred is denoted $P(E_j|E_i)$ and equals the probability of the pair of events $E_i$ and $E_j$ occurring substantially simultaneously divided by the probability of the first event $E_i$ occurring.

The probability of the pair of events $E_i$ and $E_j$ occurring substantially simultaneously is denoted $P(E_j \cap E_i)$ and equals the number of timeframes in which the pair of events $E_i$ and $E_j$ occurred substantially simultaneously divided by the number of timeframes in the sample period. In other words:

$$P(E_i I E_j) = \frac{\Omega_{ij}}{F}$$

Similarly, the probability of the first event $E_i$ occurring is denoted $P(E_i)$ and equals the number of timeframes in which the first event $E_i$ occurred divided by the number of timeframes in the sample period:

$$P(E_i) = \frac{\Omega_{ii}}{F}$$

Thus it follows that the conditional probability of the second event $E_j$ occurring substantially simultaneously, i.e. within the same timeframe, with the first event $E_i$ given that the first event $E_i$ has occurred may be calculated from the matrix $\Omega_{ij}$ using the formula:

$$P(E_j | E_i) = \frac{P(E_i I E_j)}{P(E_i)} = \frac{\Omega_{ij}}{\Omega_{ii}}$$

The statistical modeling module 124 utilizes this formula to calculate the conditional probabilities for each discrete pair of events $E_i$ and $E_j$, i=1, 2, ... N, j=1, 2, ... N, from the matrix $\Omega_{ij}$. The routine 400 then returns from operation 408 to operation 306 in routine 300, as described above.

In one embodiment, the events for which statistical correlations are determined are "natural" events, or discrete events that occur within the sample period in the event history data 120. In another embodiment, it is desirable to further compute statistical correlations between a number of "engineered" events and the natural events in the event history data 120. An engineered event is represented by an event expression which specifies a Boolean combination of natural events that must occur within a timeframe for the engineered event to be considered to have occurred in the timeframe. For example, an engineered event $A_1$ may be represented by the following expression:

$$A_1 E_1 \cap (E_2 \cup E_3)$$

In this example, the engineered event $A_1$ will be considered to have occurred in a particular timeframe of the event history data 120 if the natural event $E_1$ has occurred in the timeframe and either natural event $E_2$ or natural event $E_3$ has also occurred in the timeframe. Including engineered events in the statistical model allows for some knowledge of the network infrastructure and the interaction of fault events to be introduced into the otherwise purely statistical computation.

For the engineered event expressions to be included in the calculation of conditional probabilities described above in regard to FIG. 4, the occurrence vector $W_t(i)$ computed by the statistical modeling module 124 for each timeframe t in operation 404 will be expanded to include both the natural events $E_i$, i=1, 2, . . . N, and the engineered event expressions $A_i$, i=N+1, N+2, . . . N+M, where M is the number of engineered event expressions to be included in the computations. It will be appreciated that the value of M is likely to be small in comparison to the number of natural events N, and, therefore, the computation is not sufficiently larger in scope than the computation of the natural events described above. The statistical modeling module 124 will also expand the construction of the simultaneous event matrix $\Omega_{ij}$ in operation 406 to include each discrete pair of an engineered event $A_i$, i=N+1, N+2, . . . N+M and a natural event $E_j$, j=1, 2, . . . N, based on the expanded vector $W_t(i)$.

Similarly, in operation 408, the statistical modeling module 124 will additionally calculate the conditional probability of each natural event $E_j$ occurring substantially simultaneously with each engineered event $A_i$, given that the engineered event $A_i$ has occurred. That is, the formula:

$$P(E_j \mid A_i) = \frac{P(A_i I E_j)}{P(A_i)} = \frac{\Omega_{ij}}{\Omega_{ii}}$$

is calculated from the expanded matrix $\Omega_{ij}$ for each discrete pair of an engineered event $A_i$, i=N+1, N+2, . . . N+M and a natural event $E_j$, j=1, 2, . . . N.

In addition, in operation 308 of routine 300 described above in regard to FIG. 3, the statistical modeling module 124 will include in the list of redundant events the natural events where the conditional probability of the natural event occurring substantially simultaneously with an engineered event exceeds the threshold value. It will be appreciated that, in order to filter the redundant events dependent upon engineered events, the statistical correlation filter 114 must further be capable of detecting the occurrence of an engineered event based on its Boolean event expression, as described above.

Figure 5:
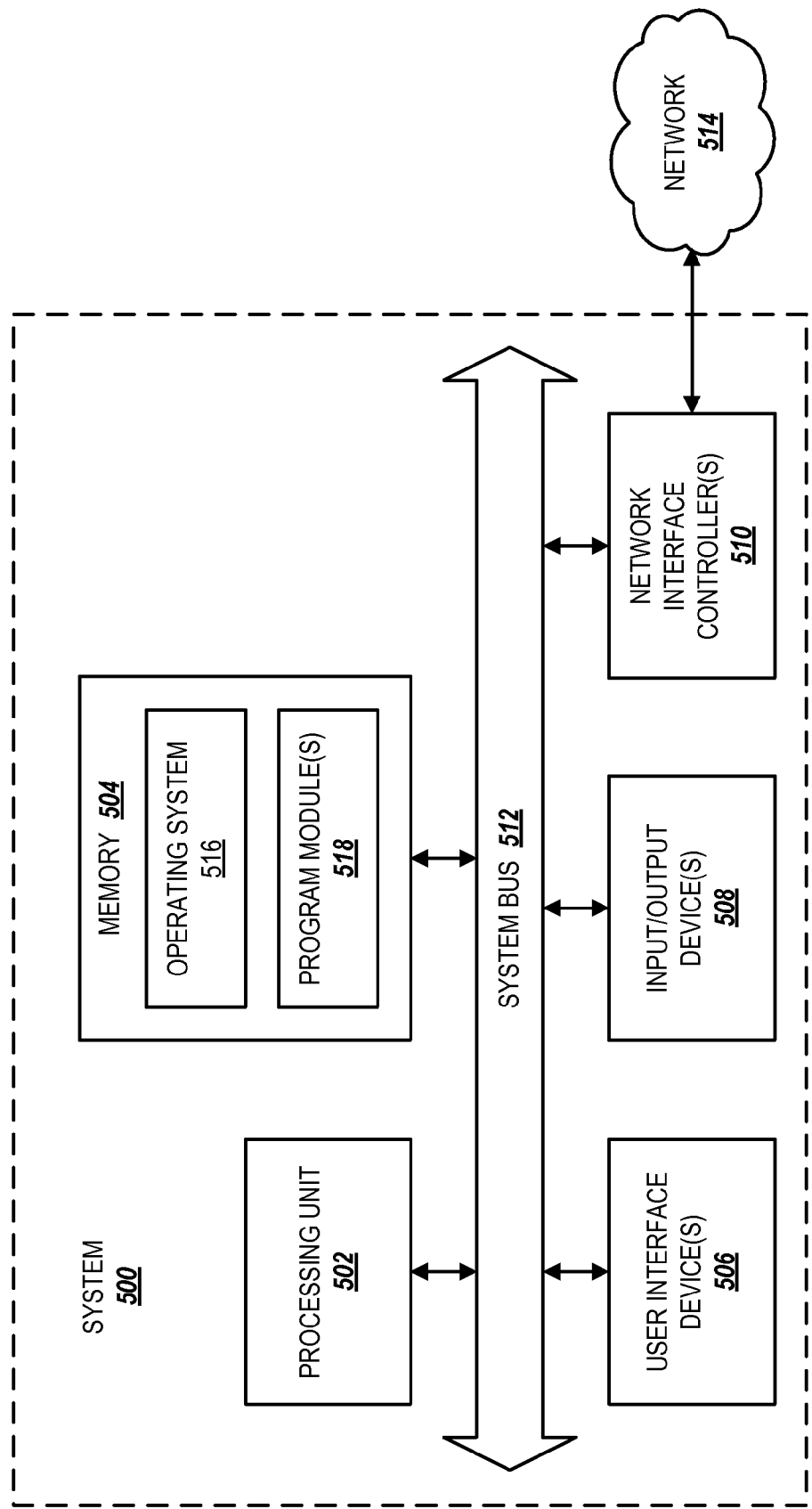
FIG. 5 is a block diagram showing an illustrative computer hardware and software architecture for a computing system capable of implementing aspects of the embodiments presented herein.

FIG. 5 is a block diagram illustrating a computer system 500 configured to filter redundant fault events generated by devices on a network based on a statistical correlation between events, in accordance with exemplary embodiments. Such a computer system 500 may be utilized to implement the data collection module 118, the statistical modeling module 124, the statistical correlation filter 114, or the fault management system 112, all described above in regard to FIG. 1. The computer system 500 includes a processing unit 502, a memory 504, one or more user interface devices 506, one or more input/output ("I/O") devices 508, and one or more network interface controllers 510, each of which is operatively connected to a system bus 512. The bus 512 enables bi-directional communication between the processing unit 502, the memory 504, the user interface devices 506, the I/O devices 508, and the network interface controllers 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the computer. Processing units are well-known in the art, and therefore not described in further detail herein.

The memory 504 communicates with the processing unit 502 via the system bus 512. In one embodiment, the memory 504 is operatively connected to a memory controller (not shown) that enables communication with the processing unit 502 via the system bus 512. The memory 504 includes an operating system 516 and one or more program modules 518, according to exemplary embodiments. Examples of operating systems, such as the operating system 516, include, but are not limited to, WINDOWS®, WINDOWS® CE, and WINDOWS MOBILE® from MICROSOFT CORPORATION, LINUX, SYMBIAN™ from SYMBIAN SOFTWARE LTD., BREW® from QUALCOMM INCORPORATED, MAC OS® from APPLE INC., and FREEBSD operating system. Examples of the program modules 518 include the data collection module 118, the statistical modeling module 124, and the statistical correlation filter 114. In one embodiment, the program modules 518 are embodied in computer-readable media containing instructions that, when executed by the processing unit 502, performs the routine 300 for filtering redundant events based on a statistical correlation between events, as described in greater detail above with respect to FIG. 3. According to further embodiments, the program modules 518 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 518. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network interface controllers 510 enable the computer system 500 to communicate with other networks or remote systems via a network 514. Examples of the network 514 may include, but are not limited to, the network 102 and the operations and management network 108. Examples of the network interface controllers 510 may include, but are not limited to, a modem, a radio frequency ("RF") or infrared ("IR") transceiver, a telephonic interface, a bridge, a router, or a network card. The network 514 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 514 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method of filtering fault events generated in a network environment, comprising:
   collecting event history data over a period of time, the event history data comprising a record of each fault event generated by a device in the network environment during the period of time;
   dividing the event history data into discrete timeframes of a specified duration, wherein fault events occurring in each timeframe are considered to have occurred substantially simultaneously;
   determining which fault events occurred in each discrete timeframe;
   constructing a simultaneous event matrix representing a count of discrete timeframes within which a first event and a second event occur substantially simultaneously for each distinct pair of fault events from the event history data;
   for each distinct pair of fault events, computing a conditional probability of the second event of the pair occurring given that the first event of the pair has occurred from the simultaneous event matrix;
   identifying a second event having the conditional probability exceeding a threshold probability as a redundant fault event; and
   removing the redundant fault event from an event stream generated by the device in the network environment.

2. The method of claim 1, further comprising;
   determining one or more event expressions comprising Boolean operations between a plurality of fault events;
   computing a statistical correlation between each distinct pair of the one or more event expressions and the fault events from the event history data; and
   identifying redundant fault events based on the statistical correlation between each distinct pair of the one or more event expressions and the fault events from the event history data.

3. The method of claim 1, wherein the conditional probability between each distinct pair of fault events is computed only for distinct pairs of fault events occurring in a particular segment of the network environment.

4. The method of claim 1, wherein the record of each fault event in the event history data comprises an event type identifier and a timestamp indicating when each fault event occurred.

5. The method of claim 1, wherein the network environment is an Internet Protocol (IP) network.

6. A system for filtering fault events generated in a network environment, comprising:
   a processor; and
   a memory coupled to the processor and containing
      a data collection module operative to collect event history data over a period of time, the event history data comprising a record of each fault event generated by a device in the network environment during the period of time,
      a statistical modeling module operative to:
         divide the event history data into discrete timeframes of a specified duration, wherein fault events occurring in each timeframe are considered to have occurred substantially simultaneously,
         determine which fault events occurred in each discrete timeframe,
         construct a simultaneous event matrix representing a count of discrete timeframes within which a first event and a second event occur substantially simultaneously for each distinct pair of fault events from the event history data,
         for each distinct pair of fault events, compute a conditional probability of the second event of the pair occurring given that the first event of the pair has occurred from the simultaneous event matrix, and
         identify a second event having the conditional probability exceeding a threshold probability as a redundant fault event, and
      a statistical correlation filter module operative to remove the redundant fault event from an event stream generated by the device in the network environment.

7. The system of claim 6, wherein the statistical modeling module is further operative to:
   accept one or more event expressions comprising Boolean operations between a plurality of fault events;
   compute a statistical correlation between each distinct pair of the one or more event expressions and the fault events from the event history data; and
   identify redundant fault events based on the statistical correlation between each distinct pair of the one or more event expressions and the fault events from the event history data.

8. The system of claim 6, wherein the conditional probability between each distinct pair of fault events is computed only for fault events occurring in a particular segment of the network environment.

9. The system of claim 6, wherein the record of each fault event in the event history data comprises an event type identifier and a timestamp indicating when each fault event occurred.

10. The system of claim 6, wherein the network environment is an Internet Protocol (IP) network.

11. A computer readable storage medium having computer executable instructions stored thereon that, when executed by a computer, cause the computer to:
- collect event history data comprising a record of each of a plurality of fault events generated by devices on a network during a period of time;
- divide the event history data into discrete timeframes of a specified duration;
- determine which of the plurality of fault events occurred in each discrete timeframe;
- construct a simultaneous event matrix representing a count of discrete timeframes within which a first event and a second event of each distinct pair of the plurality fault events from the event history data occur;
- for each distinct pair of the plurality fault events, calculate a conditional probability of the second event of the pair occurring given that the a first event has occurred from the simultaneous event matrix;
- receive a threshold probability value; and
- generate a list of redundant fault events from each distinct pair of the plurality of fault events having a conditional probability exceeding the threshold probability value.

12. The computer readable storage medium of claim 11, wherein the list of redundant fault events is utilized to filter redundant fault events from an event stream generated by devices on the network.

13. The computer readable storage medium of claim 11, having further computer executable instructions stored thereon that, when executed by a computer, cause the computer to:
- receive one or more event expressions comprising Boolean operations between fault events;
- for each distinct pair of the one or more event expressions and the plurality of fault events from the event history data, calculate a conditional probability of the fault event occurring substantially simultaneously with a condition defined by the event expression given that the condition defined by the event expression has occurred; and
- generate a list of redundant fault events from each distinct pair of the one or more event expressions and the plurality of fault events from the event history data having a conditional probability exceeding the threshold probability.

14. The computer readable storage medium of claim 11, wherein the conditional probability of a second event of the pair occurring substantially simultaneously with a first event of the pair are calculated only for distinct pairs of fault events occurring in a particular segment of the network.

15. The computer readable storage medium of claim 11, wherein the network is an Internet Protocol (IP) network.

* * * * *